US008005938B2

(12) United States Patent  (10) Patent No.: US 8,005,938 B2
Bamba  (45) Date of Patent: Aug. 23, 2011

(54) MANAGEMENT NETWORK FOR NETWORK MANAGEMENT, ITS MANAGEMENT METHOD, AND NETWORK ELEMENT USED THEREFOR

(75) Inventor: Masakazu Bamba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 94 days.

(21) Appl. No.: 12/560,558

(22) Filed: Sep. 16, 2009

(65) Prior Publication Data

US 2010/0146150 A1  Jun. 10, 2010

Related U.S. Application Data

(63) Continuation of application No. PCT/JP2007/055426, filed on Mar. 16, 2007.

(51) Int. Cl.
G06F 15/173 (2006.01)
(52) U.S. Cl. ......... 709/223; 709/224; 709/238; 709/242
(58) Field of Classification Search .............. 709/223, 709/224, 225, 229, 238, 220, 242
See application file for complete search history.

(56) References Cited

U.S. PATENT DOCUMENTS

| 6,157,622 | A | 12/2000 | Tanaka et al. |
| 6,438,648 | B1* | 8/2002 | McKean et al. ............... 711/114 |
| 7,013,334 | B2* | 3/2006 | Toyoshima et al. ........... 709/223 |
| 7,106,471 | B2* | 9/2006 | Ohwa ........................ 705/14.49 |
| 7,457,840 | B2 | 11/2008 | Futatsugi |
| 7,761,552 | B2* | 7/2010 | Nakamura et al. ............ 709/223 |
| 2002/0029263 | A1 | 3/2002 | Toyoshima et al. |
| 2002/0072966 | A1* | 6/2002 | Eldering et al. ................ 705/14 |
| 2003/0233442 | A1* | 12/2003 | Futatsugi ..................... 709/223 |
| 2005/0101314 | A1* | 5/2005 | Levi ............................ 455/423 |
| 2005/0238325 | A1* | 10/2005 | Tanabe et al. .................. 386/95 |
| 2006/0046705 | A1 | 3/2006 | Nakamura et al. |
| 2006/0294017 | A1* | 12/2006 | Kim et al. ....................... 705/59 |

FOREIGN PATENT DOCUMENTS

| JP | 10-93555 | 4/1998 |
| JP | 2002-41454 | 2/2002 |
| JP | 2004-21502 | 1/2004 |
| JP | 2005-110182 | 4/2005 |
| JP | 2006-74307 | 3/2006 |

OTHER PUBLICATIONS

International Search Report dated Apr. 17, 2007, from the corresponding International Application.

* cited by examiner

Primary Examiner — Philip B Tran
(74) Attorney, Agent, or Firm — Fujitsu Patent Center (57) ABSTRACT

A management network for managing networks managed individually by a plurality of groups, wherein authorization and unauthorization of access for supervision and control are automatically set. Each network element is assigned a TID, as a prefix, having a group ID identifying a group to which the network element belongs. Topology information considered from each network element to all network elements includes a group ID. When a group ID included in the received topology information matches the prefix of the TID assigned to its own network element, the source is registered at the authorized side of the access authorization list (step 1012), while when it does not match, it is registered at the unauthorized side (step 1016).

9 Claims, 7 Drawing Sheets

MANAGEMENT NETWORK FOR NETWORK MANAGEMENT, ITS MANAGEMENT METHOD, AND NETWORK ELEMENT USED THEREFOR

CROSS-REFERENCE TO RELATED APPLICATIONS

This application is a continuation application based on International Application No. PCT/JP2007/055426, filed on Mar. 16, 2007, the contents being incorporated herein by reference.

FIELD

The embodiments discussed herein are related to a management network for managing networks operated individually by a plurality of groups such as companies or departments within companies, for example, a network comprised of public telecommunication networks operated by a plurality of carriers connected with each other, a method of management of the same, and a network element used in the same.

BACKGROUND

When carriers and companies construct their respective networks, a network for managing those networks (management network) is constructed. This management network has network supervisory apparatus connected to it which supervises if the constructed network is operating as expected. Note that there are a first case where this management network, i.e., management and control signal network, has a network topology the same as that of the networks to be supervised and controlled, i.e., the networks of the main signals, by multiplexing the supervision and control signals onto the main signals, and a second case where this management network is provided separately from the networks for the main signals.

As explained above, there is a case where the networks constructed by carriers and companies are made up of a plurality of areas having different network operators. As a specific example, there is assumed to be a case in which carriers having specified areas of operation construct a wide area network spanning different areas of operation. For example, local telephone companies in the U.S. and cable television companies in Japan are only licensed to operate in specific areas. Here, in order for these companies to service a wide area exceeding their areas of operation, the companies connect their operating networks to form a single network. Alternatively, in a company network, there is a case where the company sets up separate network management departments in the East and West to supervise the different areas.

Figure 1:
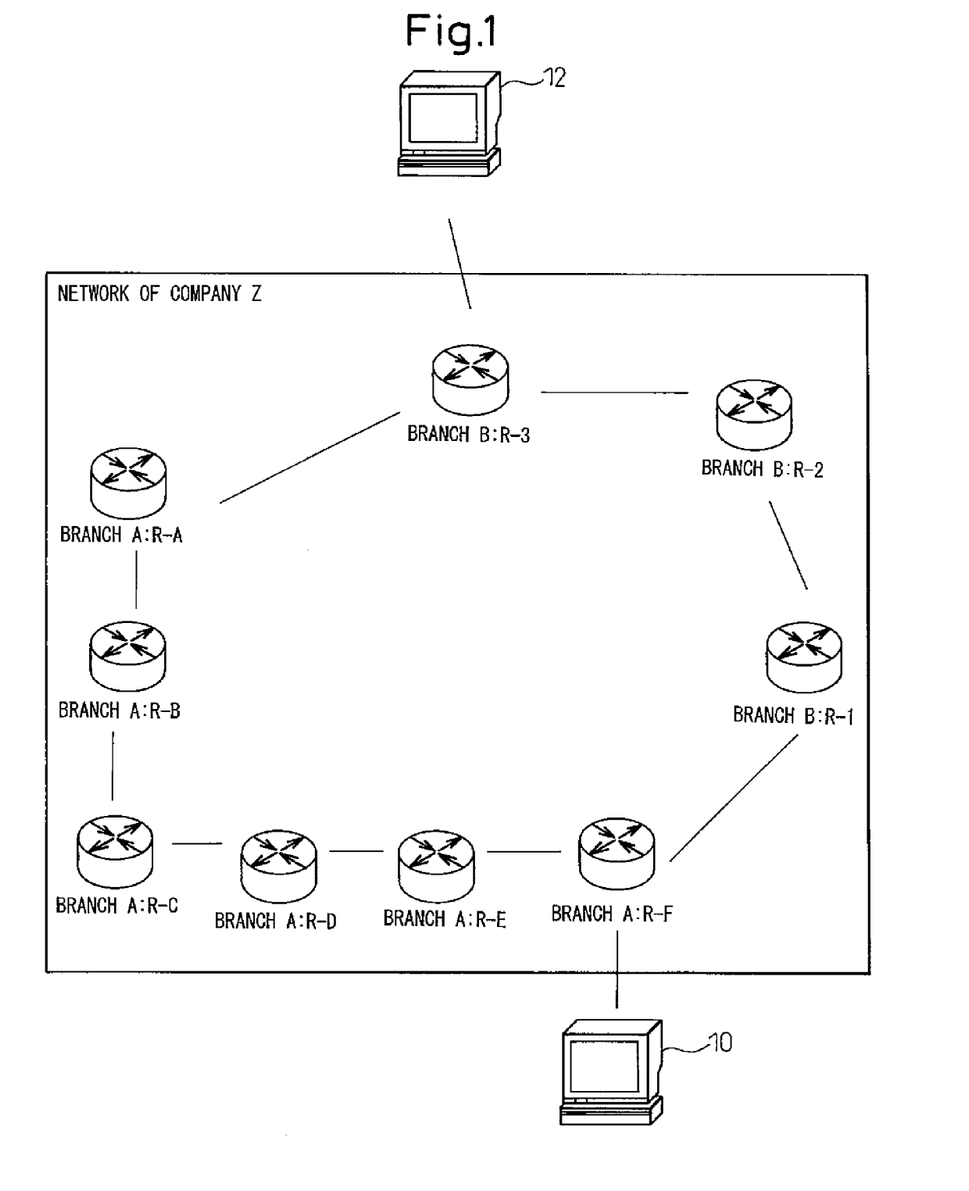
FIG. 1 is a view illustrating an example of networks managed individually by a plurality of groups.

FIG. 1 illustrates, as an example of a management network for managing these networks, a management network for managing a network (not illustrated) which is formed from network elements R-A to R-F managed by a branch A and network elements R-1 to R-3 managed by a branch B. To clarify the working ranges, the network elements managed by the branch A are allowed to be accessed from the network elements of the branch A, while the network elements of the branch B are allowed to be accessed from the network elements of the branch B. For this reason, each network apparatus compares the source information included in the received information with an access authorization list (refer to the following Table 1 and Table 2) registered in itself so as to determine whether a terminal (network element or supervisory apparatus) is allowed to access it and accepts and processes only information from receivable sources. By doing this, network elements of the branch A are prevented from being managed and operated from the branch B. This means that, from the viewpoint of the branch A, unintentional modification of network elements managed by itself (branch A) due to mistaken operation of a person at the branch B is prevented and, conversely, its mistaken operation of the network elements of the branch B is prevented. Note that, the "TID" in the following Table 1 and Table 2 is an abbreviation for "Target Identification" and is identification used for identifying network elements in an OSI protocol. Further, the (authorized/unauthorized) addresses are IP addresses. That is, in the examples illustrated in Table 1 and Table 2, authorization/unauthorization may be judged not only by the TIDs in the OSI protocol, but also the IP addresses in the IP protocol.

TABLE 1

List of Authorization to Access Network Elements Managed by Branch A

| Authorized ID | Authorized address | Unauthorized ID | Unauthorized address |
|---|---|---|---|
| R-A | A.A.A.A | R-1 | 1.1.1.1 |
| R-B | B.B.B.B | R-2 | 2.2.2.2 |
| R-C | C.C.C.C | R-3 | 3.3.3.3 |
| R-D | D.D.D.D | | |
| R-E | E.E.E.E | | |
| R-F | F.F.F.F | | |

TABLE 2

List of Authorization to Access Network Elements Managed by Branch B

| Authorized ID | Authorized Address | Unauthorized ID | Unauthorized Address |
|---|---|---|---|
| R-1 | 1.1.1.1 | R-A | A.A.A.A |
| R-2 | 2.2.2.2 | R-B | B.B.B.B |
| R-3 | 3.3.3.3 | R-C | C.C.C.C |
| | | R-D | D.D.D.D |
| | | R-E | E.E.E.E |
| | | R-F | F.F.F.F |

This conventional method focused on blocking access to one's own (for example, the branch A's) network elements from unauthorized parties. Therefore, through what route information, communicated between the network elements, actually reaches a destination network element is not taken into account. When not considering the routes in this way, the following inconveniences will occur.

[Inconvenience at the Side Passing Information]

1) Information instructing operations for management of network elements, for example, pass through the networks of other groups, so it is needed to encrypt information which one does not wish to be seen by other groups.

2) If unintended work is performed in a network inside the networks managed by another group due to deliberate change of a route in the management network of the other group, the expected information will sometimes not arrive at the destination.

[Inconveniences at the Side to Which Information is Passed]

3) The management information of another group is sent to the network of one's own group, so the throughput (available bandwidth etc.) for the information one wishes to be communicated within one's own group is not obtained as expected.

4) If the information of another group is abnormal, for example, the size of the information violates the standards, the management network of one's own group is liable to be destroyed.

[Inconveniences Common to the Side Passing Information and the Side to Which Information is Passed]

5) If physically disconnecting the connections relating to network management to avoid the aforementioned inconveniences 1) to 4), when management is required such as at the time of emergency maintenance of the network as a whole or establishment or deletion of communication paths exceeding the management area, the work of connecting and disconnecting the management network or reconfiguring the management network becomes necessary. This runs counter to the objective of combining a plurality of groups into a single network.

In actuality, this will be explained with reference to the example of FIG. 1. The supervisory apparatus 10 of the branch A is connected to the network element R-F. The branch A tries to supervise its own management area from this R-F. Therefore, the R-A, R-B, R-C, R-D, R-E, and R-F covered by management by the branch A are registered at the authorized side in the access authorization list illustrated in the above Table 1. Therefore, access from elements other than what the branch A has authorized is prohibited. However, when R-F tries to access information of R-A, no particular consideration is given to route calculation and route selection, so the following route may be considered.

R-F→R-1→R-2→R-3→R-A

If passing through the network elements (R-E, R-D . . . ) in the management area of the branch A, it is necessary to go through five network elements. On the other hand, if passing through the area of the branch B, it is only necessary to go through three network elements (R-1, R-2, and R-3).

Further, as a basic operation, access authorization lists are held by each of the network elements. Operators are required to register the network elements being managed, on one hand, as authorized network elements and, on the other hand, as the unauthorized network elements. Therefore, if the number of network elements managed increases, the trouble (the amount of work) involved for the registration, updating, and deletion will also increase. This trouble becomes an inconvenience to be overcome in the prior art.

Patent Literature 1: Japanese Laid-Open Patent Publication No. 2006-074307

SUMMARY

According to a first aspect of the embodiments, elements are registered in the access authorization lists automatically without human intervention.

According to a second aspect of the embodiments, one group realizes route calculation and route selection without going through the network of another group.

The first aspect relates to a management method of a management network for managing networks individually managed by a plurality of groups, comprising assigning, as a target ID identifying each network element forming a management network, the target ID including as part of it a group ID identifying the group which manages each network element to each network element forming the network; having each network element forming the management network advertise advertisement information including the group ID of the group managing its own network elements to the entire management network; and having each network element forming the management network validate an access authorization list when receiving the advertisement information including the group ID, registering the network element of the source of the advertisement information at an authorized side of the access authorization list when the group ID contained in the received advertisement information matches the group ID contained in the target ID assigned to its own network element, and registering it at an unauthorized side of the access authorization list when it does not match.

A second aspect relates to a method further comprising having each network element forming the management network calculate a route only for the network elements registered at the authorized side of the access authorization list if the access authorization list is valid and calculate a route for all network elements forming the management network if the access authorization list invalid.

DESCRIPTION OF EMBODIMENTS

An example of an embodiment applied to a system that manages OSI (Open Systems Interconnection) protocol-operated network compliant with Bellcore GR-253-CORE and in which the IP (Internet Protocol) is introduced will be explained.

Figure 2:
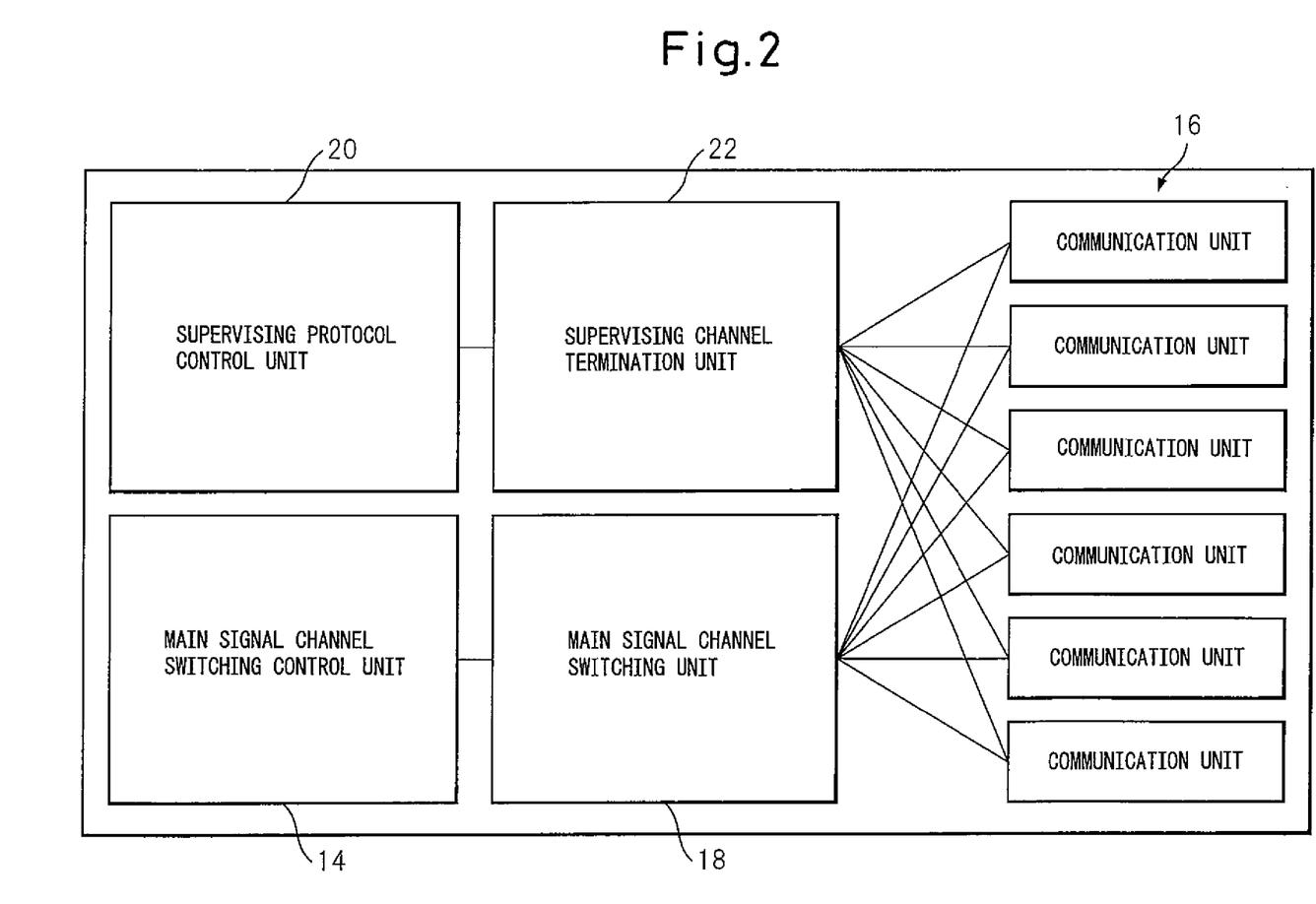
FIG. 2 is a block diagram illustrating an example of the configuration of network elements.

FIG. 2 illustrates the configuration of a transmission apparatus used as a network element forming the above network.

A main signal channel switching control unit 14 controls the connections between the communication units 16. Regarding these connections, a main signal channel switching unit 18 exchanges and connects specified channel switching units (for example, the STS-ch (channel) in the SONET (synchronous optical network) and the STM-ch (channel) in the SDH (Synchronous Digital Hierarchy)) of a specified communication unit 16 to each other.

The main signal channel switching unit 18 is a channel connection unit for connecting the main signal transferred from one communication unit 16 to another communication unit 16. One specified STS-ch and another specified STS-ch, for example, are connected between the specified units 16.

The communication units 16 are units for terminating optical (OCn) and electrical (ECn) signals. The communication units 16 also terminate the supervision channel inside the overhead of a SONET/SDH/WDM (SONET: Synchronous Optical Network; SDH: Synchronous Digital Hierarchy; WDM: Wavelength Division Multiplexing).

A supervising protocol control unit 20 processes network management protocols such as routing protocols necessary for GMPLS (Global Multi-Protocol Label Switching) network management, that is, OSPF-TE (Open Shortest Path First-Traffic Engineering), RSVP-TE (Resource to reSerVation Protocol-Traffic Engineering), etc.

A supervising channel termination unit 22 terminates GMPLS network related information being transferred in accordance with OSI and TCP/IP protocols, while the supervising protocol control unit 20 formats them into an easily processable form.

Figure 3:
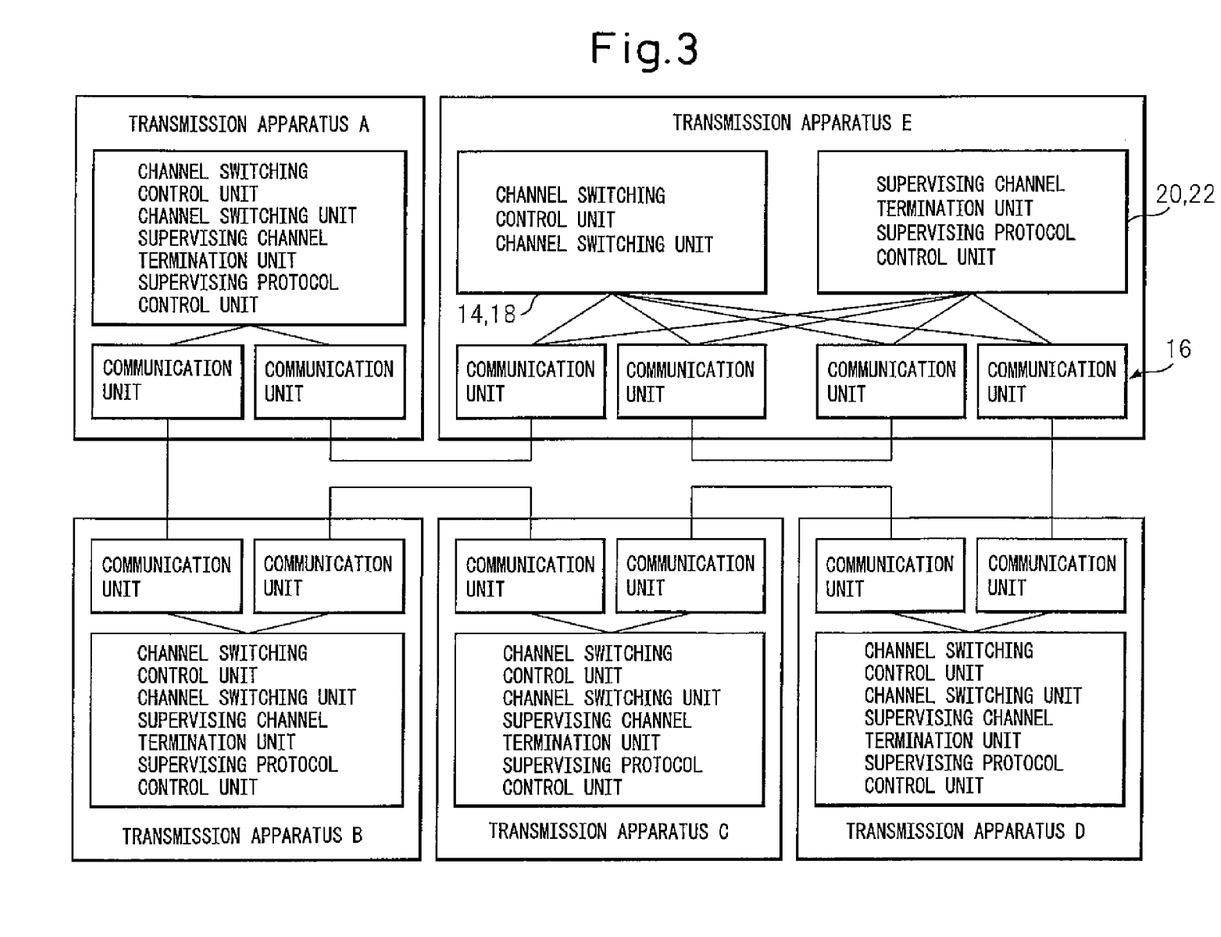
FIG. 3 is a view illustrating an example of a 2F-BLSR configured by the network elements of FIG. 2.

FIG. 3 illustrates a network configuration when five transmission apparatuses A to E of the configuration of FIG. 2 configure a 2F-BLSR (Bidirectional Live Switched Ring). In this example, there are control protocol communication paths on the communication units 16, and therefore, no supervision protocol communication network, that is, management network, is depicted. This is a so-called "InBand" system which uses the same network as the one transferring the main signal to transfer the network management information. As opposed to this, there is also an "OutBand" system. In this case, a communication path exclusively for a supervision protocol is required to be set up between the transmission apparatuses.

The network of the company Z illustrated in FIG. 1 is actually managed by two branches (branch A and branch B). In the conventional methods, it had been required to manually construct access authorization lists such as in the above Table 1 and Table 2 in each of the network elements belonging to the network (Z) in order to maintain the independence of the branch A and branch B from each other. This network (Z) is divided into management areas and the relations between the management areas are loosely established by executing the next routine.

1) According to the Bellcore GR-253-CORE standard, each network element is assigned a TID comprised of a string of characters of for example up to 20 characters. In the embodiment of the present invention, several characters are inserted at part of the character string, for example, as a prefix, and assigned as the character string for identifying the group managing the network element (group ID). Further, each network element is set showing which part of the link state information in the routing protocol such as the OSPF-TE/ISIS-TE is used to advertise the group ID. For example, the area of the Administrative Group included in the LSA (Link State Advertisements) of the OSPF-TE defined by the RFC3630 or the area of the SRLG (Shared Risk Link Group) included in the LSA expanded by the RFC4203 may be used for notification of the group ID.

2) The prefix information is set in the SRLG or Administrative Group and is advertised within the network by a routing protocol such as OSPF-TE.

3) The network element receiving the advertisement information compares the group ID notified by the advertisement information with the group ID contained in the TID which has been assigned to itself. If it is determined that it belongs to the same group, the element registers for example the TID and the IP address of the source at the authorized side of the access authorization lists illustrated in Table 1 and Table 2, while if not, it registers them at the unauthorized side. When the SRLG contains a special release ID instructing the invalidation and clearing of the access authorization list, the network element receiving the release ID invalidates the access authorization list and clears the contents.

4) When connecting one network element to another network element, the route is calculated for only the network elements registered as authorized in the access authorization list. By doing so, information may be passed through the same management area (management domain). When no route is found by the route calculation, this is notified to the operator. Therefore, the operator is able to recognize that route cannot be set in the same management area. Further, when restrictions have been released by the release ID, i.e., when the access authorization list is invalidated, routes are calculated for determining the shortest routes for example with respect to all of the network elements and a route enabling communication is selected from the results of the calculation. Therefore, for example, when management of the entire network is temporarily necessary, e.g., at the time of emergency maintenance of the entire network or establishment or deletion of communication paths over the management areas, management and operation of the entire network become possible without requiring work such as manual setting by maintenance personnel at each network element.

5) A control operation, such as a login, from a certain network element is performed after processing for determining authorization or unauthorization in accordance with the access authorization lists. Further, when control has been released by a release ID or when restrictions have been released by the operator, control operations from other network elements are authorized and operations under those authorized control operations may be performed without referring to the access authorization lists.

6) When the prefix of the release ID is changed to a normal prefix, the route is calculated taking into account the restrictions of the management area, the access authorization list is reconfigured, and control operations are accepted only from the management area of one's own group from among the other network elements.

To implement this, first, preparatory operations are performed for each network element belonging to the network. As illustrated in Table 3, three parameters are set for each network element.

TABLE 3

Information Registered for Network Elements

| Function | Settable values |
| --- | --- |
| TID | Displayable ASCII characters - 20 characters (including prefix) |
| Prefix range | 0 characters to 20 characters |
| Advertisement method | SRLG, Admin-Group, other |
| Prefix setting | Uncompressed, compressed (ZIP), other |
| Release ID | 0 characters to 20 characters |

Figure 4:
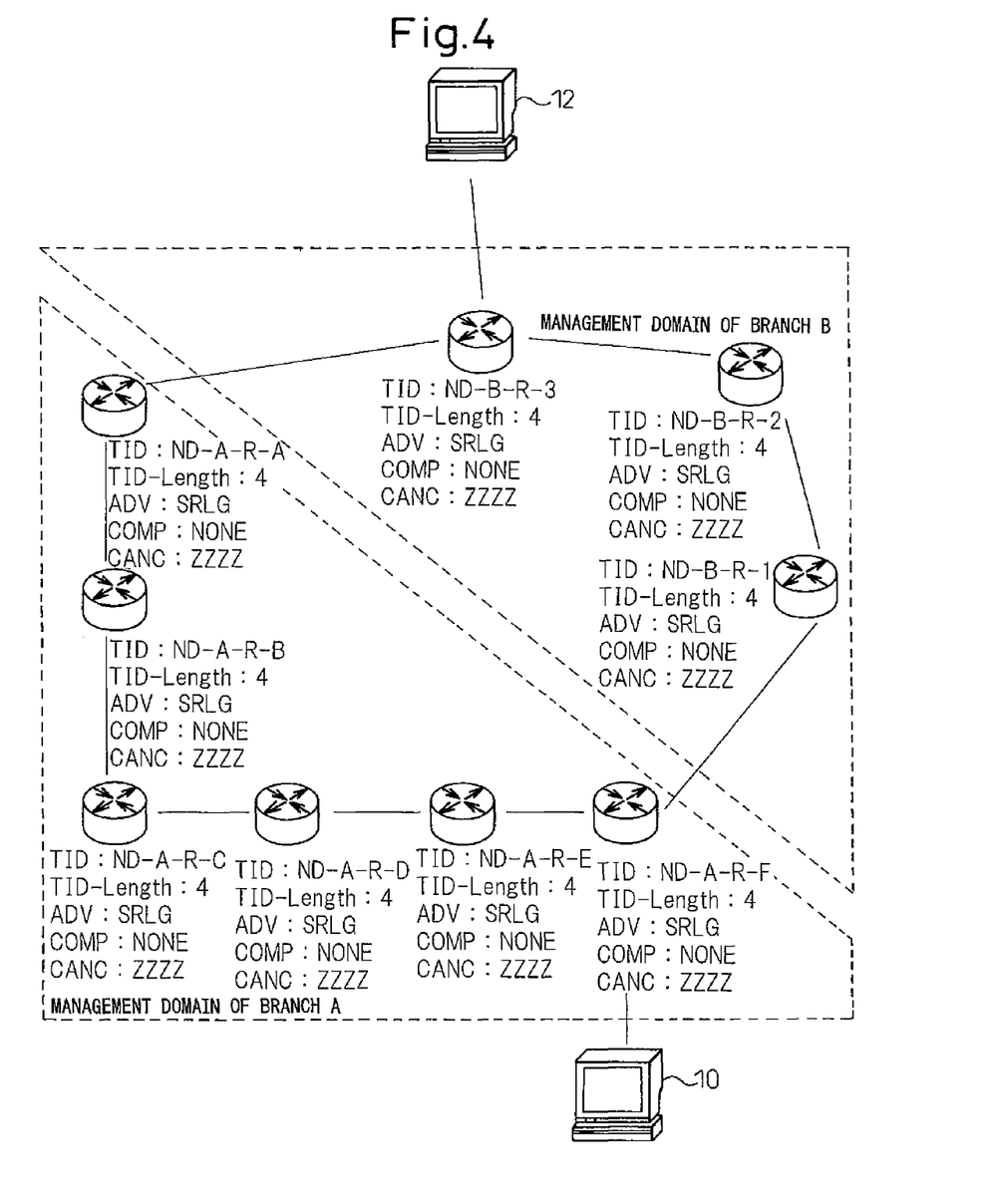
FIG. 4 is a view illustrating an example of information set in advance in each network element in an embodiment of the invention.

The states of the network elements set based on this Table 3 are illustrated in FIG. 4. According to these settings, the four characters at the beginning of a TID show the affiliation, as a group ID, to the branch A (ND-A) or the branch B (ND-B). Further, the advertisement method (ADV) of the group ID is unified, inside of the network, to use SRLGs. When registering as SRLGs, it is uncompressed (COMP: NONE), and the keyword invalidating the access authorization list (release ID: CANC) is defined as "ZZZZ".

In accordance with the method determined here, next an SRLG including the group ID is assembled and is advertised in the network in accordance with the routing protocol (OSPFTE and ISISTE). According to RFC4203, because a 64 bit area is determined as the area for the SRLG, a group ID of up to eight characters may be stored if one character is 8 bits.

Figure 5:
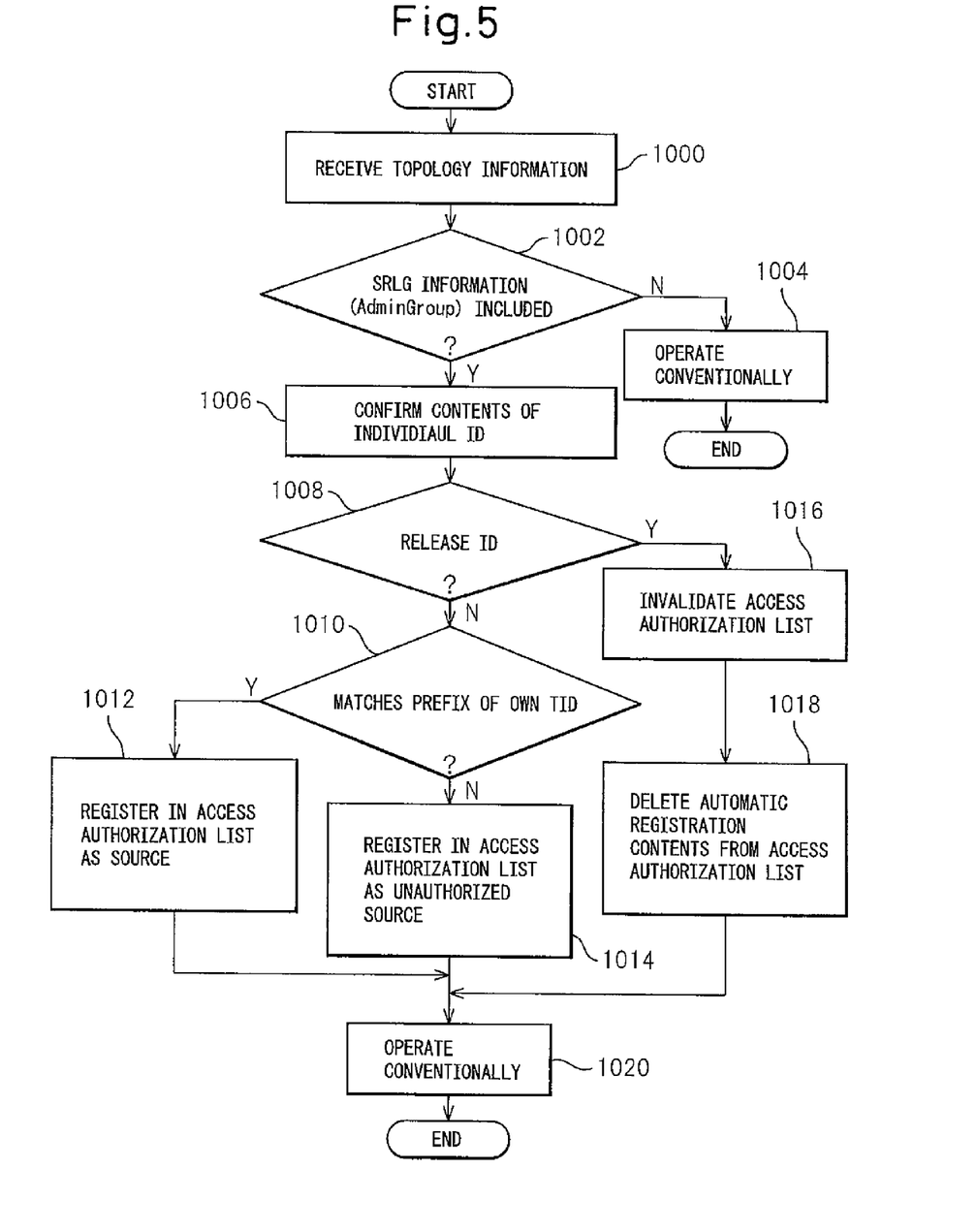
FIG. 5 is a flowchart illustrating processing when each network element has received topology information in an embodiment of the invention.

FIG. 5 illustrates the processing in each network element when receiving advertisement information (topology information). If receiving topology information (step 1000), first, whether information set in advance to contain group IDs or release IDs, i.e., SRLG (or AdminGroup), is included is examined (step 1002). If not included (NO), a conventional normal operation such as recording of topology information is performed (step 1004). If included (YES), the contents are confirmed (step 1006). If the contents are not a release ID (step 1008), whether it matches the prefix of the TID assigned to its own network is examined (step 1010). If the two match (YES), the advertisement source (source) is registered at the authorized side of the access authorization list (step 1012). If they do not match (NO), it is registered at the unauthorized side (step 1014). Thereby, in each network element, an access authorization list such as illustrated in the following Table 4 and Table 5 is created.

TABLE 4

Access Authorization List of ND-A Area

| Authorized TID | Authorized Address | Unauthorized ID | Unauthorized Address |
|---|---|---|---|
| ND-A-R-A | A.A.A.A | ND-B-R-1 | 1.1.1.1 |
| ND-A-R-B | B.B.B.B | ND-B-R-2 | 2.2.2.2 |
| ND-A-R-C | C.C.C.C | ND-B-R-3 | 3.3.3.3 |
| ND-A-R-D | D.D.D.D | | |
| ND-A-R-E | E.E.E.E | | |
| ND-A-R-F | F.F.F.F | | |

TABLE 5

Access Authorization List of ND-B Area

| Authorized TID | Authorized Address | Unauthorized ID | Unauthorized Address |
|---|---|---|---|
| ND-B-R-1 | 1.1.1.1 | ND-A-R-A | A.A.A.A |
| ND-B-R-2 | 2.2.2.2 | ND-A-R-B | B.B.B.B |
| ND-B-R-3 | 3.3.3.3 | ND-A-R-C | C.C.C.C |
| | | ND-A-R-D | D.D.D.D |
| | | ND-A-R-E | E.E.E.E |
| | | ND-A-R-F | F.F.F.F |

At step 1008, when the content of the SRLG (or AdminGroup) is a release ID, the access authorization list is invalidated (step 1016) and the contents of the access authorization list are deleted (step 1018). Thereby, supervision and control over the management areas become possible, and emergency maintenance of the entire network becomes possible. In each of the cases of steps 1012, 1014, and 1018, a conventional normal operation such as recording of topology information is performed (step 1020).

Figure 6:
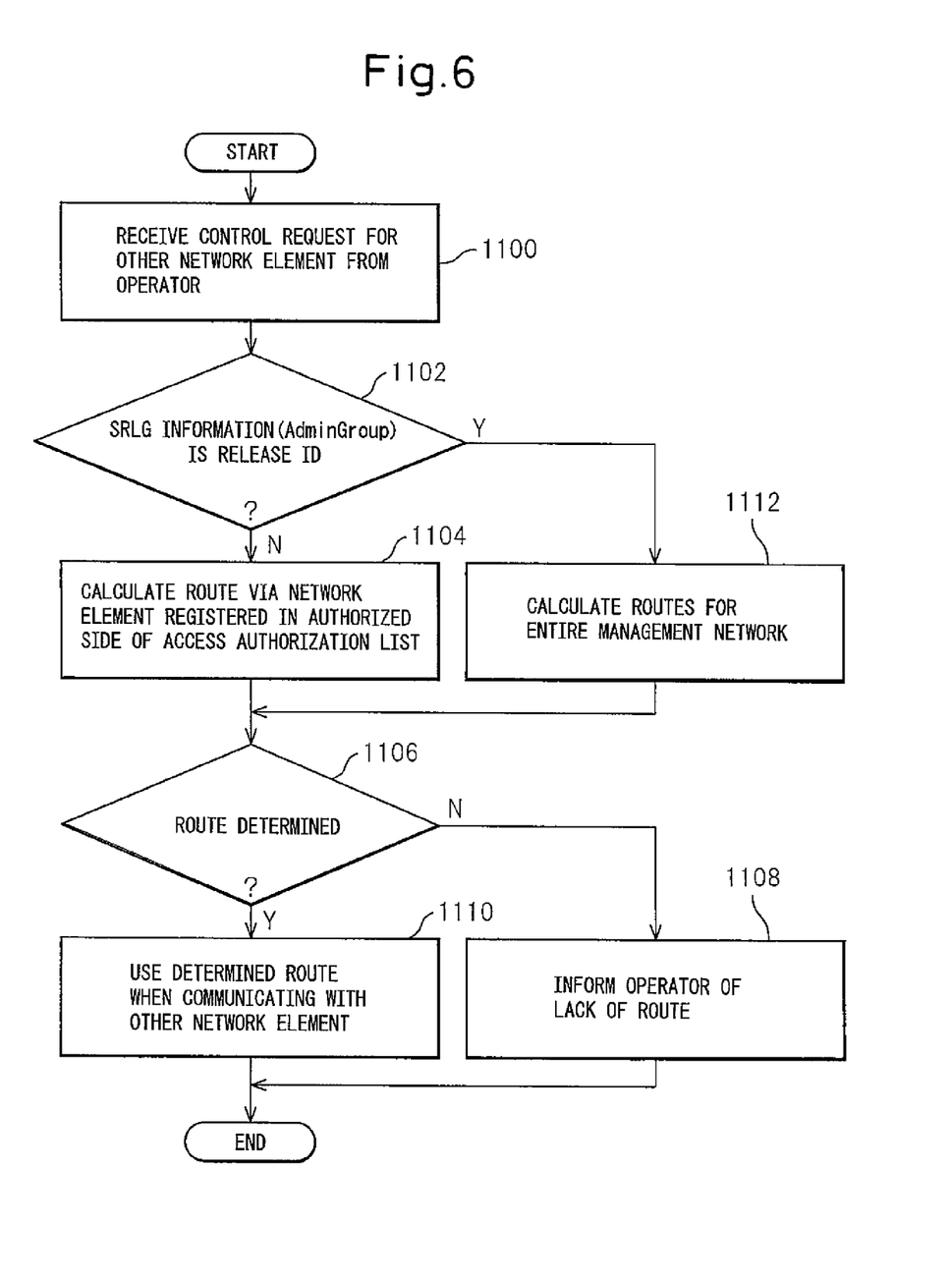
FIG. 6 is a flowchart illustrating the steps for route calculation in each network element.

FIG. 6 is a flowchart for processing at a certain network element (first network element) when receiving a control request from a second network element such as supervisory unit 10 or 12 (FIG. 4) operated by an operator to a third network element and calculating the route to the third network element. When the certain network element receives a control request for another network element from an operator (step 1100), first, whether the ID set in the SRLG information (or the AdminGroup) included in the control request is a release ID is examined (step 1102). If it is not a release ID, but a group ID representing a group to which its own, a second and third network elements belong, a route is calculated only for the network elements registered at the authorized side of the access authorization list (step 1104). If no route is found, the operator is informed that there is no route (step 1108). If a route is found, the route found is used for the route to the other network element (third network element) thereafter (step 1110). When a release ID is included at the above step 1102 (YES), routes are calculated for the entire management network (step 1112). Due to this, situations can be swiftly dealt with, in which the control and supervision beyond the normal management range are required.

Figure 7:
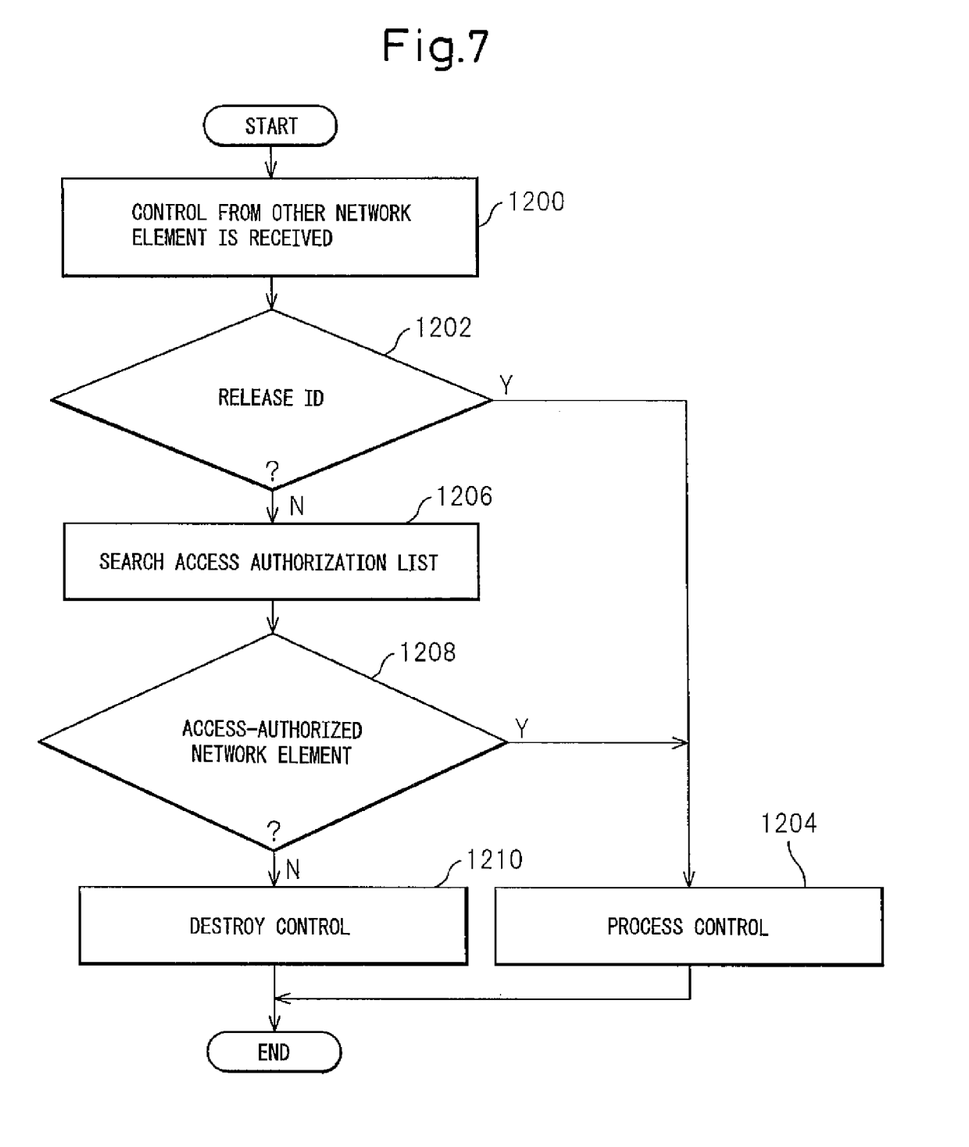
FIG. 7 is a flowchart of processing when there is a control request from another network element.

FIG. 7 is a flowchart for processing when a network element receives a control request for one's own network element from another network element. When receiving a control request from another network element (step 1200), if a release ID is included in the control request (step 1202), the requested control is executed (step 1204). If a group ID other than a release ID is included (step 1202, NO), the access authorization list is searched in order to examine whether access from the source of the control is authorized (step 1206). If the source is an access-authorized network element (step 1208, YES), the requested control is executed (step 1204), while if not authorized (NO), the control is destroyed (step 1210).

Note that, as in prior art, manual operation by an operator of the access authorization list is also possible. Thereby, in addition to built an access authorization list actively, the list may also be built statically.

What is claimed is:

1. A management method for managing a network comprising a plurality of network elements, comprising:

assigning, as a target ID identifying each network element forming a management network, the target ID including as part of it a group ID indicating belonging to a certain group to each network element forming the management network;

having each network element advertise advertisement information including the group ID to the entire management network;

having each network element extract a group ID included in the advertisement information when receiving the advertisement information, authorize access from a network element of a source of the received advertisement information when the group ID matches the group ID contained in the target ID assigned to its own network element, and not authorize access from a network element of a source of the received advertisement information when it does not match and having each network element forming the management network calculate a route only for network elements registered at the authorized side of the access authorization list if the access authorization list is valid and calculate a route for all network elements forming the management network if the access authorization list invalid.

2. A management method of a management network for managing networks individually managed by a plurality of groups, comprising:

assigning, as a target ID identifying each network element forming a management network, the target ID including as part of it a group ID identifying a group which manages each network element to each network element forming the management network;

having each network element forming the management network advertise advertisement information including the group ID of a group managing its own network element;

having each network element forming the management network validate an access authorization list when receiving the advertisement information including the group ID, register a network element that is the source of the received advertisement information at an authorized side of the access authorization list when the group ID matches the group ID contained in the target ID assigned to its own network element, and register it at an unauthorized side when it does not match and having each network element forming the management network calculate a route only for network elements registered at the authorized side of the access authorization list if the access authorization list is valid and calculate a route for all network elements forming the management network if the access authorization list invalid.

3. The method as set forth in claim 2, further comprising having each network element forming the management network authorize access from a network element registered at the authorized side of the access authorization list and deny access from a network element registered at the unauthorized side of the access authorization list, if the access authorization list is valid.

4. The method as set forth in claim 2, further comprising having at least one of the network elements forming the management network advertise advertisement information including a release ID invalidating the access authorization list, in place of the group ID, to the entire management network and having each network element forming the management network invalidate the access authorization list and delete the registration of the access authorization list when receiving the advertisement information including the release ID.

5. The method as set forth in claim 4, wherein ignoring the access authorization list when receiving a control request including the release ID and proceeding with the process.

6. A network element used in a management network for managing networks individually managed by a plurality of groups, the network element including a processor and a memory cooperating with the processor, the network element comprising:

a first unit, implemented by the processor, advertising advertisement information including a group ID of the group managing its own network element to the entire management network;

a second unit, implement by the processor, validating an access authorization list, stored in the memory, when receiving the advertisement information including the group ID, registering a network element of a source of the received advertisement information at an authorized side of the access authorization list when the group ID matches the group ID included in a target ID assigned to its own network element, and registering it at an unauthorized side when it does not match; and a third unit, implemented by the processor, calculating a route only for network elements registered at the authorized side of the access authorization list if the access authorization list is valid and calculating a route for all network elements forming the management network if the access authorization list invalid.

7. The network element as set forth in claim 6, further comprising a fourth unit, implemented by the processor, authorizing access from a network element registered at the authorized side of the access authorization list and denying access from a network element registered at the unauthorized side of the access authorization list, if the access authorization list is valid.

8. The network element as set forth in claim 6, further comprising:

a fifth unit, implemented by the processor, advertising the advertisement information including a release ID invalidating the access authorization list, in place of the group ID, to the entire management network; and a sixth unit, implemented by the processor, invalidating the access authorization list and deleting the registration of the access authorization list when receiving the advertisement information including the release ID.

9. The network element as set forth in claim 8, wherein ignoring the access authorization list when receiving a control request including the release ID and proceeding with process.

\* \* \* \* \*